United States Patent
Oowada et al.

(10) Patent No.: US 12,208,678 B2
(45) Date of Patent: Jan. 28, 2025

(54) FRONT-REAR WHEEL DRIVING FORCE DISTRIBUTION DEVICE AND FRONT-REAR WHEEL DRIVING FORCE DISTRIBUTION DEVICE CONTROLLER

(71) Applicant: SUBARU CORPORATION, Tokyo (JP)

(72) Inventors: Norio Oowada, Tokyo (JP); Hiroomi Kobayashi, Tokyo (JP); Taichi Murai, Tokyo (JP); Takeshi Yoneda, Tokyo (JP); Yosuke Takebayashi, Tokyo (JP); Minoru Suyama, Tokyo (JP); Tatsuya Takayanagi, Tokyo (JP); Akihiro Nabeshima, Tokyo (JP); Kaoru Sugano, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 187 days.

(21) Appl. No.: 18/168,826

(22) Filed: Feb. 14, 2023

(65) Prior Publication Data
US 2023/0278421 A1 Sep. 7, 2023

(30) Foreign Application Priority Data
Mar. 7, 2022 (JP) .................... 2022-034103

(51) Int. Cl.
*B60K 17/344* (2006.01)
*B60K 17/26* (2006.01)
(Continued)

(52) U.S. Cl.
CPC .............. *B60K 17/35* (2013.01); *B60K 17/34* (2013.01); *F16H 37/082* (2013.01); *F16H 48/06* (2013.01);
(Continued)

(58) Field of Classification Search
CPC ............... F16H 37/022; F16H 37/082; F16H 2037/026; F16H 48/06; F16H 48/22;
(Continued)

(56) References Cited

U.S. PATENT DOCUMENTS

2001/0050188 A1* 12/2001 Ima .................. B62D 61/10
180/22
2005/0155800 A1* 7/2005 Hasegawa ............ F16D 55/40
180/22
2010/0263958 A1* 10/2010 Kochidomari ....... B60K 17/342
180/366

FOREIGN PATENT DOCUMENTS

JP 2011-247297 A 12/2011

* cited by examiner

Primary Examiner — Tinh Dang
(74) Attorney, Agent, or Firm — Rimon P.C.

(57) ABSTRACT

A front-rear wheel driving force distribution device includes a center differential and a limited slip differential. The limited slip differential includes a first clutch, a second clutch, a first piston, a second piston, and a one-way clutch provided between the first clutch and a rear propeller shaft. If the second clutch is engaged by the second piston, the propeller shaft on the rear side rotates at increased speed as compared with a case where the first clutch is engaged by the first piston. The one-way clutch couples the first clutch and the rear propeller shaft if a number of rotations of the first clutch is same as or higher than a number of rotations of the rear propeller shaft, and idles if the number of rotations of the first clutch is lower than the number of rotations of the rear propeller shaft.

18 Claims, 10 Drawing Sheets

(51) Int. Cl.
*B60K 17/34*     (2006.01)
*B60K 17/346*    (2006.01)
*B60K 17/348*    (2006.01)
*B60K 17/35*     (2006.01)
*F16H 37/08*     (2006.01)
*F16H 48/06*     (2006.01)
*F16H 48/22*     (2006.01)
*F16H 48/32*     (2012.01)
*F16H 48/36*     (2012.01)
B60K 17/16       (2006.01)
F16H 48/20       (2012.01)

(52) U.S. Cl.
CPC ............ *F16H 48/22* (2013.01); *F16H 48/32* (2013.01); *B60K 17/165* (2013.01); *B60K 17/344* (2013.01); *B60K 17/346* (2013.01); *F16H 2048/202* (2013.01); *F16H 2048/204* (2013.01)

(58) Field of Classification Search
CPC .......... F16H 48/32; F16H 48/36; F16H 48/11; F16H 2048/202; F16H 2048/204; B60K 17/02–17/358
See application file for complete search history.

US 12,208,678 B2

FRONT-REAR WHEEL DRIVING FORCE DISTRIBUTION DEVICE AND FRONT-REAR WHEEL DRIVING FORCE DISTRIBUTION DEVICE CONTROLLER

CROSS-REFERENCE TO RELATED APPLICATIONS

The present application claims priority from Japanese Patent Application No. 2022-034103 filed on Mar. 7, 2022, the entire contents of which are hereby incorporated by reference.

BACKGROUND

The disclosure relates to a front-rear wheel driving force distribution device and a front-rear wheel driving force distribution device controller.

Japanese Unexamined Patent Application Publication (JP-A) No. 2011-247297 discloses, in a third embodiment, a driving force control device that is able to control, by selectively putting a first clutch and a second clutch into friction engagement, torque distribution to left and right output shafts that output rotary power to drive shafts that are coupled to and drive left and right drive wheels.

SUMMARY

An aspect of the disclosure provides a front-rear wheel driving force distribution device to be applied to a vehicle. The front-rear wheel driving force distribution device includes a center differential and a limited slip differential. The center differential is configured to distribute and output rotating torque inputted from a transmission of the vehicle to a propeller shaft on a front side and a propeller shaft on a rear side. The limited slip differential includes a first clutch, a second clutch, a first piston configured to engage the first clutch, a second piston configured to engage the second clutch, and a one-way clutch provided between the first clutch and the propeller shaft on the rear side. The propeller shaft on the rear side is configured to, in a case where the second clutch is engaged by the second piston, rotate at increased speed as compared with a case where the first clutch is engaged by the first piston. The one-way clutch is configured to couple the first clutch and the propeller shaft on the rear side in a case where a number of rotations of the first clutch is same as a number of rotations of the propeller shaft on the rear side or higher than the number of rotations of the propeller shaft on the rear side, and idle in a case where the number of rotations of the first clutch is lower than the number of rotations of the propeller shaft on the rear side.

An aspect of the disclosure provides a front-rear wheel driving force distribution device controller configured to control a front-rear wheel driving force distribution device to be applied to a vehicle. The front-rear wheel driving force distribution device includes a center differential and a limited slip differential. The center differential is configured to distribute and output rotating torque inputted from a transmission of the vehicle to a propeller shaft on a front side and a propeller shaft on a rear side. The limited slip differential includes a first clutch, a second clutch, a first piston configured to engage the first clutch, a second piston configured to engage the second clutch, and a one-way clutch provided between the first clutch and the propeller shaft on the rear side. The propeller shaft on the rear side is configured to, in a case where the second clutch is engaged by the second piston, rotate at increased speed as compared with a case where the first clutch is engaged by the first piston. The one-way clutch is configured to couple the first clutch and the propeller shaft on the rear side in a case where a number of rotations of the first clutch is same as a number of rotations of the propeller shaft on the rear side or higher than the number of rotations of the propeller shaft on the rear side, and idle in a case where the number of rotations of the first clutch is lower than the number of rotations of the propeller shaft on the rear side. The front-rear wheel driving force distribution device controller is configured to operate the first piston to control engagement and disengagement of the first clutch, and operate the second piston to control engagement and disengagement of the second clutch.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
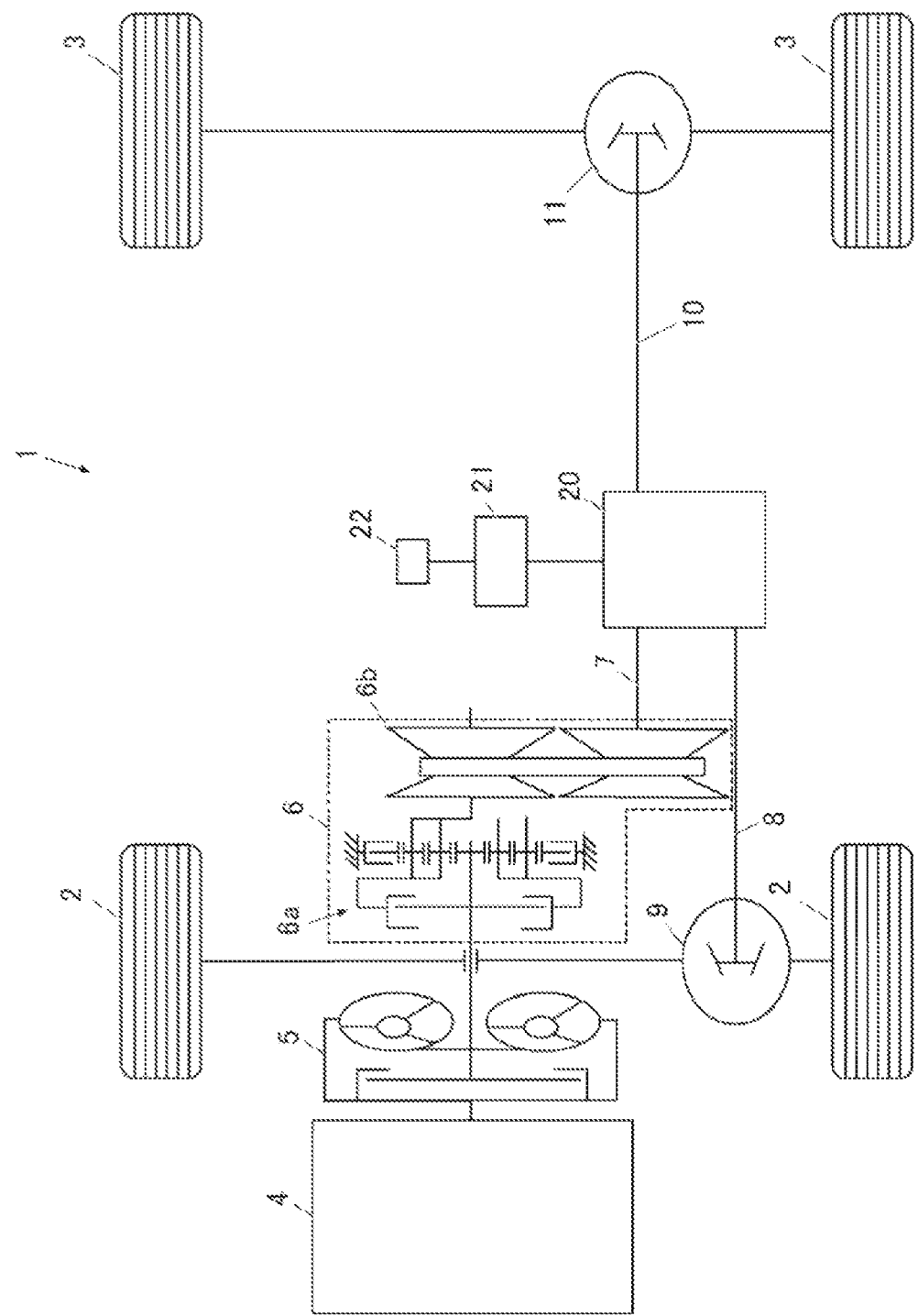
FIG. 1 is a diagram illustrating a configuration example of a vehicle equipped with a front-rear wheel driving force distribution device and a controller according to one example embodiment.

In a configuration disclosed in JP-A No. 2011-247297, in a case where a first clutch and a second clutch are put into friction engagement, i.e., engaged, at the same time, left and right drive wheels can be locked unless clutch slipping occurs.

It is therefore desired to perform control precisely to prevent the first clutch and the second clutch from being engaged at the same time. This, however, requests a high technical level.

This can be a concern not only in a case of distributing torque to the left and right drive wheels by the first clutch and the second clutch as described above, but also in a front-rear wheel driving force distribution device that distributes driving force to front wheels and rear wheels.

It is desirable to provide a front-rear wheel driving force distribution device and a front-rear wheel driving force distribution device controller that make it possible to easily and appropriately perform distribution of driving force to front wheels and rear wheels.

In the following, some example embodiments of a front-rear wheel driving force distribution device and a front-rear wheel driving force distribution device controller of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

The front-rear wheel driving force distribution device may be mounted on a vehicle, and may have a limited slip differential (LSD) function and a front-rear differential rotation control function. Although the following describes a case where the vehicle is a four-wheel-drive vehicle, a similar description applies to an all-wheel-drive vehicle including six or more wheels.

FIG. 1 is a diagram illustrating a configuration example of a vehicle 1 equipped with a front-rear wheel driving force distribution device and a controller according to an example embodiment.

The vehicle 1 may include two left and right front wheels 2 serving as first drive wheels, two left and right rear wheels 3 serving as second drive wheels, a power source 4, a torque converter 5, and a transmission 6. The torque converter 5 may receive an output of the power source 4 to amplify rotating torque. The transmission 6 may perform shifting of an output of the torque converter 5.

The power source 4 may be an engine, i.e., an internal combustion engine, or an electric motor, or may include both an engine and an electric motor.

The transmission 6 may include a forward and reverse switching mechanism 6a and a continuously variable transmission (CVT) 6b as illustrated in FIG. 1. However, the transmission 6 is not limited to this configuration. The transmission 6 may be an automatic transmission or a manual transmission.

The transmission 6 may have an output shaft 7 coupled to a front-rear wheel driving force distribution device 20.

A propeller shaft 8 on a front side may extend frontward from the front-rear wheel driving force distribution device 20. The propeller shaft 8 may transmit driving force to the front wheels 2 via a differential gear 9 on the front side (a so-called front differential).

A propeller shaft 10 on a rear side may extend rearward from the front-rear wheel driving force distribution device 20. The propeller shaft 10 may transmit driving force to the rear wheels 3 via a differential gear 11 on the rear side (a so-called rear differential).

In addition, a controller 21 for the front-rear wheel driving force distribution device 20 may be electrically coupled to the front-rear wheel driving force distribution device 20.

[Configuration of Front-Rear Wheel Driving Force Distribution Device]

Figure 2:
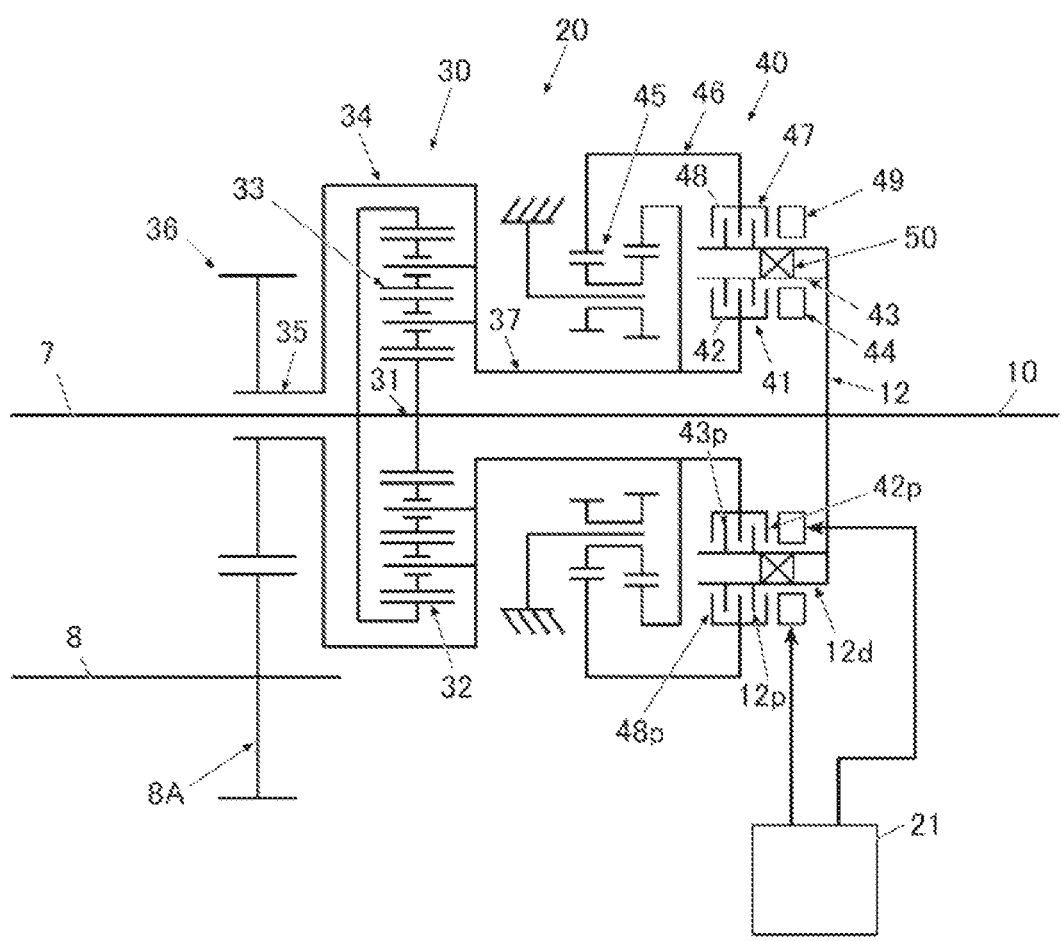
FIG. 2 is a skeleton diagram illustrating a configuration of the front-rear wheel driving force distribution device according to one example embodiment.

Next, a description is given of a configuration of the front-rear wheel driving force distribution device 20 according to the example embodiment, on the basis of a skeleton diagram in FIG. 2.

In the following description, in the front-rear wheel driving force distribution device 20, a side close to the front wheels 2 is referred to as front or the front side, and a side close to the rear wheels 3 is referred to as rear or the rear side.

As illustrated in FIG. 2, the front-rear wheel driving force distribution device 20 may include a center differential 30 and a limited slip differential 40.

Note that, although a wording such as "cylinder" or "cylindrical" is used in the following description, a modification may be made; for example, a cylindrical shape may partly be provided with an opening for a purpose such as weight reduction.

[Configuration of Center Differential]

The center differential 30 may be configured as a compound planetary gear center differential gear. The center differential 30 may include, for example, a sun gear 31, a ring gear 32, planetary gears 33, and a carrier 34.

The center differential 30 may distribute and output the rotating torque inputted from the transmission 6 to the ring gear 32, to the propeller shaft 8 on the front side via a part such as the carrier 34, and to the propeller shaft 10 on the rear side via the sun gear 31.

A detailed description is given below.

The sun gear 31 may have a substantially cylindrical shape. To a rotary shaft at the center of the sun gear 31, the propeller shaft 10 on the rear side described above may be coupled to extend rearward.

In the example embodiment, the sun gear 31 may thus be coupled to the propeller shaft on the rear side, which allows rotation of the sun gear 31 to be directly transmitted to the propeller shaft 10 on the rear side.

An outer circumferential surface of the sun gear 31 may have multiple teeth arranged circumferentially.

The ring gear 32 with a ring shape may be disposed outside the sun gear 31. An inner circumferential surface of the ring gear 32 may have multiple teeth arranged circumferentially.

A front part of the ring shape of the ring gear 32 may be bent in a rotation center direction. In front of the sun gear 31, the output shaft 7 of the transmission 6 described above may be coupled to a rotation center of the ring gear 32. The output shaft 7 of the transmission 6 and the rotary shaft of the sun gear 31 may be coaxial with each other.

The multiple planetary gears 33 may be disposed between the sun gear 31 and the ring gear 32. An outer circumferential surface of the planetary gear 33 may have multiple teeth arranged circumferentially.

The multiple teeth on the outer circumferential surface of the planetary gear 33 may be meshed with the multiple teeth on the outer circumferential surface of the sun gear 31 and with the multiple teeth on the inner circumferential surface of the ring gear 32.

The carrier 34 may support the multiple planetary gears 33 to allow revolution thereof around the rotary shaft of the sun gear 31. In addition, the carrier 34 may support each planetary gear 33 to allow rotation thereof around a central axis of each planetary gear 33.

The carrier 34 may pass outside the ring gear 32 to extend further frontward than a front end of the sun gear 31, and the extending part may serve as a first output shaft 35 to the propeller shaft 8 on the front side.

The first output shaft 35 may have a cylindrical shape coaxial with the output shaft 7 of the transmission 6, and may be disposed to surround the output shaft 7 of the transmission 6.

A driven gear 36 may be attached to an outer circumferential surface of the first output shaft 35. The driven gear 36 may have teeth arranged circumferentially and meshed with teeth of a drive gear 8A attached to the propeller shaft 8 on the front side.

As described above, in the example embodiment, rotation of the carrier 34 may be transmitted to the propeller shaft 8 on the front side via the first output shaft 35, the driven gear 36, and the drive gear 8A.

In the example embodiment, a gear ratio between the driven gear 36 and the drive gear 8A of the propeller shaft 8 may be 1:1, and the propeller shaft 8 on the front side may accordingly axially rotate at the same number of rotations [rpm] as the first output shaft 35, i.e., the carrier 34.

The carrier 34 may also extend further rearward than a rear end of the sun gear 31, and the extending part may serve as a second output shaft 37 to the limited slip differential 40.

The second output shaft 37 may have a cylindrical shape coaxial with the propeller shaft on the rear side, and may be disposed to surround the propeller shaft 10.

[Configuration of Limited Slip Differential]

The limited slip differential 40 may be configured as a hydraulic multiple-disc limited slip differential (LSD) gear.

The limited slip differential 40 may include, for example, a first clutch 41, a second clutch 47, a first drum 42, a second drum 48, a third drum 43, a first piston 44, a second piston 49, a speed-increasing gear group 45, and a one-way clutch 50.

[Configuration of First Clutch]

The first clutch 41 may include the first drum 42 and multiple first clutch plates 42p, and the third drum 43 and multiple second clutch plates 43p.

At a rear end of the second output shaft 37 of the carrier 34, the first drum 42 with a cylindrical shape may be provided to be coaxial with the second output shaft 37. If the carrier 34 rotates and the second output shaft 37 axially rotates, the first drum 42 may axially rotate coaxially with a central axis of the second output shaft 37, in accordance with the rotation of the second output shaft 37.

In the example embodiment, the propeller shaft 8 on the front side may axially rotate at the same number of rotations [rpm] as the carrier 34 as described above.

Therefore, the first drum 42 may constantly rotate at the same number of rotations [rpm] as the propeller shaft 8 on the front side.

The multiple first clutch plates 42p may be provided to protrude outward radially on an outer circumferential surface of the first drum 42.

The multiple first clutch plates 42p may be arranged in parallel in a central axis direction of the first drum 42 (i.e., a front-rear direction).

The third drum 43 with a cylindrical shape may be disposed outside the first drum 42. The multiple second clutch plates 43p may be provided to protrude inward radially on an inner circumferential surface of the third drum 43.

The multiple second clutch plates 43p may be arranged in parallel in a central axis direction of the third drum 43 (i.e., the front-rear direction).

The second clutch plates 43p may be disposed in a state of each being inserted between the first clutch plates 42p of the first clutch 41.

In other words, the first clutch plate 42p and the second clutch plate 43p may be disposed in a state of being alternately arranged in the front-rear direction.

[Configuration and Operation of First Piston]

The first piston 44 may be disposed in the rear of the first clutch plate 42p of the first clutch 41. In another example, the first piston 44 may be disposed in front of a part such as the first clutch plate 42p.

The first piston 44 may be movable in the front-rear direction by an unillustrated actuator.

If the first piston 44 moves frontward and presses the first clutch plate 42p of the first clutch 41 frontward, the first clutch plate 42p and the second clutch plate 43p may be engaged.

In other words, the first clutch 41 may be engaged by the first piston 44.

If the first clutch 41 is engaged, the first drum 42 and the third drum 43 may rotate around their central axes at the same number of rotations [rpm].

The first drum 42 may rotate around the central axis at the same number of rotations [rpm] as the second output shaft 37 of the carrier 34. Accordingly, the first clutch 41 being engaged results in a state in which the third drum 43 rotates around the central axis at the same number of rotations [rpm] as the second output shaft 37, i.e., the carrier 34.

In addition, the propeller shaft 8 on the front side may axially rotate at the same number of rotations [rpm] as the carrier 34, as described above.

Therefore, engaging the first clutch 41 by the first piston 44 results in a state in which the first drum 42 and the third drum 43 axially rotate at the same number of rotations [rpm] as the propeller shaft 8 on the front side.

Note that, in the following, a state in which the first clutch 41 is engaged and the first drum 42 and the third drum 43 axially rotate may be referred to as a state in which the first clutch 41 axially rotates.

In other words, engaging the first clutch 41 by the first piston 44 results in a state in which in the first clutch 41 axially rotates at the same number of rotations [rpm] as the propeller shaft 8 on the front side.

Consequently, in the example embodiment, engaging the first clutch 41 by the first piston 44 results in a state in which the third drum 43 rotates around the central axis at the same number of rotations [rpm] as the propeller shaft 8 on the front side.

If the first piston 44 moves rearward, pressing on the first clutch plate 42p of the first clutch 41 may be released.

This results in disengagement of the first clutch 41, i.e., disengagement between the first clutch plate 42p of the first drum 42 and the second clutch plate 43p of the third drum 43.

[Configuration of Second Clutch]

On the other hand, the speed-increasing gear group 45 configured to increase and output the number of rotations of the second output shaft 37 may be attached to the second output shaft 37 of the carrier 34.

The speed-increasing gear group 45 may increase the number of rotations inputted from the second output shaft 37 by a predetermined ratio (e.g., several percent), and cause a speed-increasing output shaft 46 to axially rotate coaxially with the second output shaft 37 at the increased number of rotations.

The second clutch 47 may include the second drum 48 and multiple third clutch plates 48*p*, and a cylindrical part 12*d* of a rear drum 12 and multiple fourth clutch plates 12*p*.

The second drum 48 may be provided at a rear end of the speed-increasing output shaft 46. If the speed-increasing output shaft 46 axially rotates, the second drum 48 may axially rotate coaxially with the second output shaft 37 in accordance with the rotation of the speed-increasing output shaft 46.

In other words, if the second output shaft 37, i.e., the carrier 34, rotates, the second drum 48 may rotate at the number of rotations [rpm] increased by the predetermined ratio relative to the number of rotations of the carrier 34.

In the example embodiment, the propeller shaft 8 on the front side may axially rotate at the same number of rotations [rpm] as the carrier 34 as described above.

Therefore, the second drum 48 may constantly rotate at the number of rotations [rpm] increased by the predetermined ratio relative to the number of rotations of the propeller shaft 8 on the front side.

The multiple third clutch plates 48*p* may be provided to protrude inward radially on an inner circumferential surface of the second drum 48.

The multiple third clutch plates 48*p* may be arranged in parallel in a central axis direction of the second drum 48 (i.e., the front-rear direction).

Inside the second drum 48, the cylindrical part 12*d* of the rear drum 12 with a closed-end cylindrical shape fixed to the propeller shaft 10 on the rear side may be disposed.

the multiple fourth clutch plates 12*p* may be provided to protrude outward radially on an outer circumferential surface of the cylindrical part 12*d* of the rear drum 12.

The multiple fourth clutch plates 12*p* may be arranged in parallel in a central axis direction of the cylindrical part 12*d* (i.e., the front-rear direction).

The fourth clutch plates 12*p* may be disposed in a state of each being inserted between the third clutch plates 48*p* of the second clutch 47. In other words, the fourth clutch plate 12*p* and the third clutch plate 48*p* may be disposed in a state of being alternately arranged in the front-rear direction.

[Configuration and Operation of Second Piston]

The second piston 49 may be disposed in the rear of the third clutch plate 48*p* of the second clutch 47. In another example, the second piston 49 may be disposed in front of a part such as the third clutch plate 48*p*.

The second piston 49 may be movable in the front-rear direction by an unillustrated actuator.

If the second piston 49 moves frontward and presses the third clutch plate 48*p* of the second clutch 47 frontward, the third clutch plate 48*p* and the fourth clutch plate 12*p* may be engaged. In other words, the second clutch 47 may be engaged by the second piston 49.

If the second clutch 47 is engaged, the second drum 48 and the rear drum 12 may rotate around their central axes at the same number of rotations [rpm].

The second drum 48 may rotate around the central axis at the number of rotations [rpm] increased by the predetermined ratio relative to the number of rotations of the second output shaft 37 of the carrier 34.

Therefore, engaging the second clutch 47 results in a state in which the rear drum 12 rotates around the central axis at the number of rotations [rpm] increased by the predetermined ratio relative to the number of rotations of the second output shaft 37, i.e., the carrier 34.

The propeller shaft 8 on the front side may axially rotate at the same number of rotations [rpm] as the carrier 34, as described above.

Therefore, engaging the second clutch 47 by the second piston 49 results in a state in which the second drum 48 and the rear drum 12 axially rotate at the number of rotations [rpm] increased by the predetermined ratio relative to the number of rotations of the propeller shaft 8 on the front side.

Note that, in the following, a state in which the second clutch 47 is engaged and the second drum 48 and the rear drum 12 axially rotate may be referred to as a state in which the second clutch 47 axially rotates.

In the following, a state in which the propeller shaft 10 on the rear side rotates at the number of rotations [rpm] increased by the predetermined ratio relative to the number of rotations of the propeller shaft 8 on the front side may be referred to as, for example, rotation at increased speed.

Figure 3:
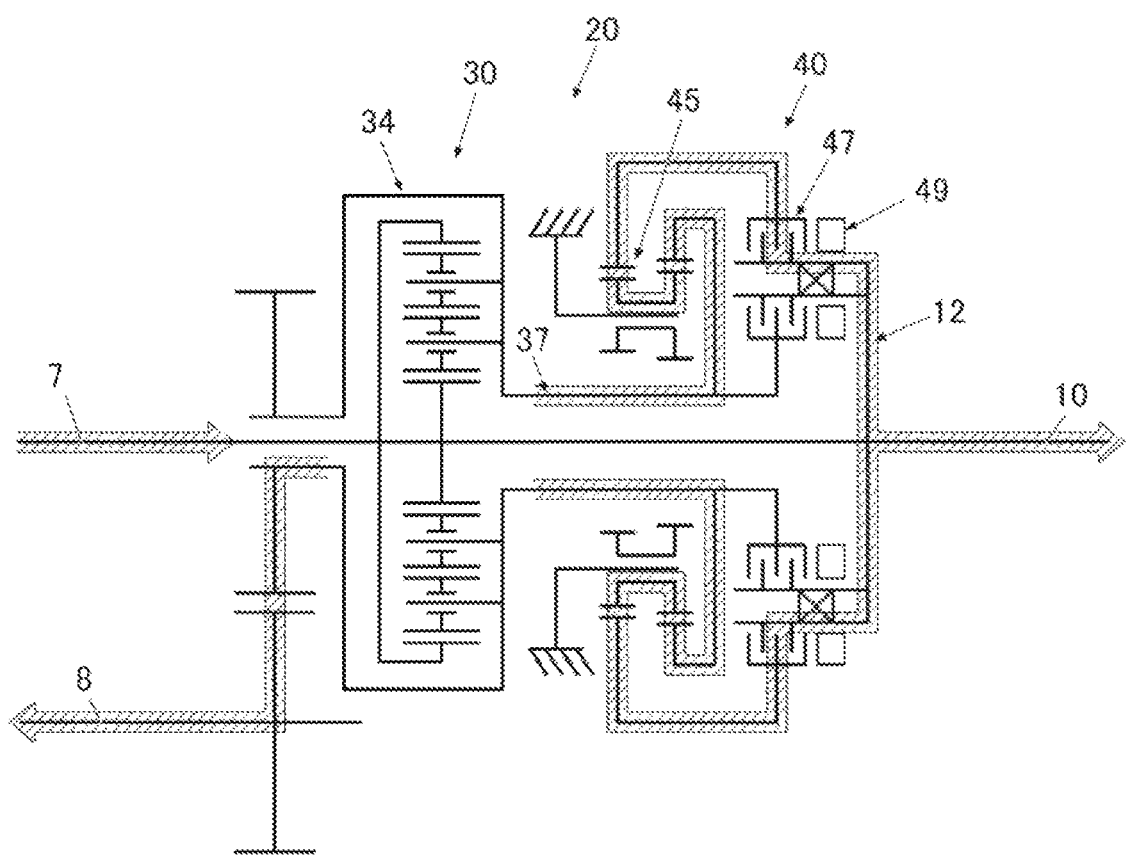
FIG. 3 is a diagram illustrating a state in which rotation increased in speed by a speed-increasing gear group is transmitted to a propeller shaft on a rear side via a part such as a second clutch.

For example, if the second clutch 47 is engaged by the second piston 49, rotation increased in speed by the speed-increasing gear group 45 may be transmitted to the propeller shaft 10 on the rear side, via the second clutch 47 and the rear drum 12, as illustrated in FIG. 3. Note that, in FIG. 3 and FIG. 4 to be described later, illustration of the controller 21 is omitted.

Consequently, in the example embodiment, engaging the second clutch 47 by the second piston 49 results in a state in which the propeller shaft 10 on the rear side rotates at the number of rotations increased relative to the number of rotations of the propeller shaft 8 on the front side. In other words, the rear wheels 3 may thus be increased in speed.

If the second piston 49 moves rearward, pressing on the third clutch plate 48*p* of the second clutch 47 may be released.

This results in disengagement of the second clutch 47, i.e., disengagement between the third clutch plate 48*p* of the second drum 48 and the fourth clutch plate 12*p* of the rear drum 12.

[Arrangement and Operation of One-Way Clutch]

The one-way clutch 50 may be provided between the third drum 43 and the rear drum 12, i.e., the propeller shaft 10 on the rear side.

The one-way clutch 50 may couple the third drum 43 and the rear drum 12, in a case where the number of axial rotations of the third drum 43, i.e., the number of rotations of the first clutch 41, is the same as or higher than the number of axial rotations of the rear drum 12, i.e., the number of rotations of the propeller shaft 10 on the rear side.

In other words, the one-way clutch 50 couples the first clutch 41 and the propeller shaft on the rear side, in a case where the number of rotations of the first clutch 41 is the same as or higher than the number of rotations of the propeller shaft 10 on the rear side.

Figure 4:
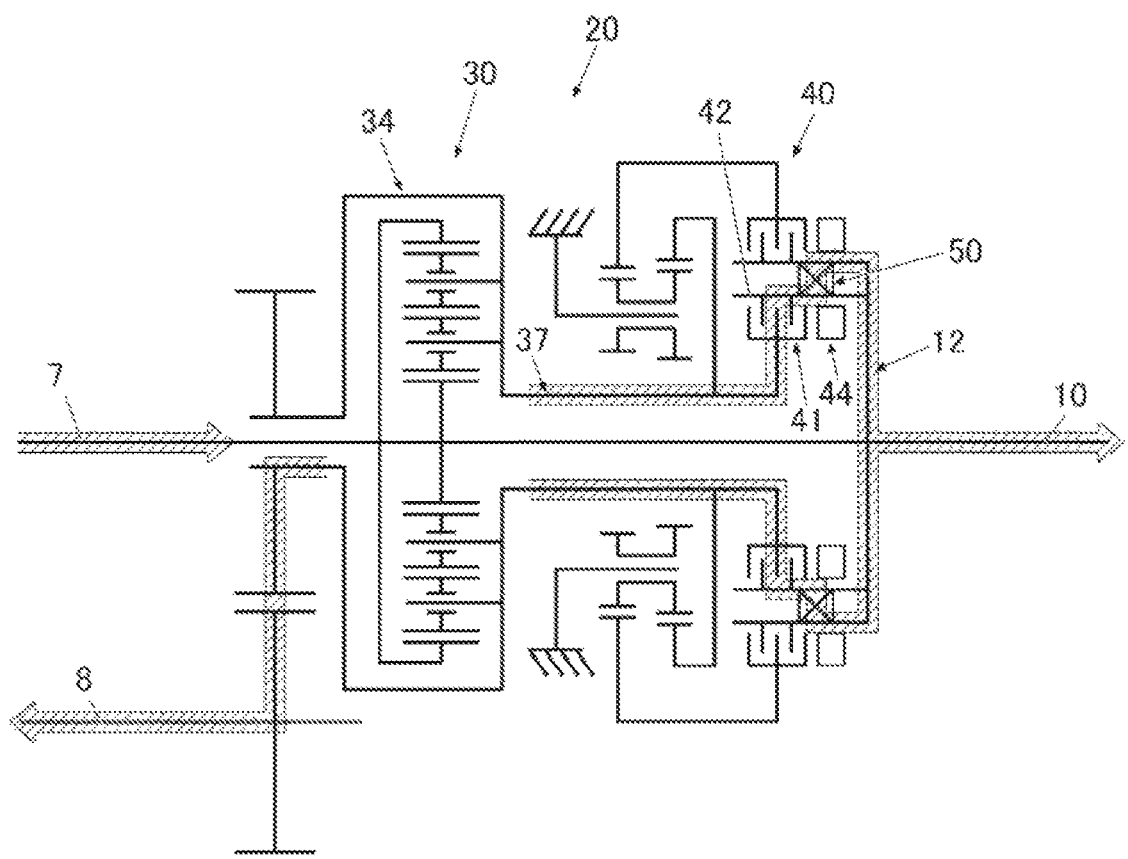
FIG. 4 is a diagram illustrating a state in which rotation of a first clutch is transmitted to the propeller shaft on the rear side via a part such as a one-way clutch.

If the first clutch 41 is coupled to the propeller shaft 10 on the rear side via the one-way clutch 50, rotation of the first clutch 41 may be transmitted to the propeller shaft 10 on the rear side via a part such as the one-way clutch 50, as illustrated in FIG. 4.

This results in a state in which the propeller shaft 10 on the rear side rotates at the same number of rotations [rpm] as the number of rotations of the propeller shaft 8 on the front side. Note that, in the following, the state in which the propeller shaft 10 on the rear side rotates at the same number of rotations [rpm] as the number of rotations of the propeller shaft 8 on the front side may be referred to as, for example, rotation at equal speed.

The one-way clutch 50 idles in a case where the number of rotations of the first clutch 41 is lower than the number of rotations of the propeller shaft 10 on the rear side.

Therefore, in this case, the first clutch 41 and the propeller shaft 10 on the rear side are not coupled, which blocks transmission of the rotating torque from the first clutch 41 to the propeller shaft 10 on the rear side.

[Front-Rear Wheel Driving Force Distribution Device Controller]

A description is given next of the controller 21 for the front-rear wheel driving force distribution device 20 according to the example embodiment. Note that the controller 21 for the front-rear wheel driving force distribution device 20 may hereinafter be simply referred to as the controller 21.

In the example embodiment, the controller 21 may be configured as an electric control unit (ECU). The controller 21 may be configured as a single ECU, or may be integrated with a transmission ECU, for example.

As illustrated in FIG. 1, the controller 21 may be electrically coupled to sensors 22 that measure, for example, a steering angle of an unillustrated steering wheel, an amount of operation, i.e., a position, of an unillustrated accelerator pedal, and a yaw rate of the vehicle 1.

In addition, the controller 21 may include an unillustrated storage that stores a control program, for example.

The controller 21 may control the front-rear wheel driving force distribution device 20 by executing the control program stored in the storage.

The controller 21 may be able to control at least the respective actuators of the first piston 44 and the second piston 49 of the limited slip differential 40 of the front-rear wheel driving force distribution device 20, to operate the first piston 44 and the second piston 49 independently from each other.

The controller 21 operates the first piston 44 of the front-rear wheel driving force distribution device 20 to control engagement and disengagement of the first clutch 41.

In addition, the controller 21 operates the second piston 49 of the front-rear wheel driving force distribution device 20 to control engagement and disengagement of the second clutch 47.

[How to Increase or Reduce Number of Rotations of Rear Wheels]

In the example embodiment, the controller 21 may operate the second piston 49 to control the engagement and disengagement of the second clutch 47, while keeping a state in which the first piston 44 is operated to engage the first clutch 41.

By performing such control, the controller 21 may increase or reduce the number of rotations of the rear wheels 3, by switching the number of rotations of the propeller shaft 10 on the rear side between a state of rotating at equal speed and a state of rotating at increased speed.

A detailed description is given below of an example of how to increase or reduce the number of rotations of the rear wheels 3 in the example embodiment.

Also described are example workings of the front-rear wheel driving force distribution device 20 and the controller 21 for the front-rear wheel driving force distribution device 20 according to the example embodiment.

If the rotating torque is supplied from the output shaft 7 of the transmission 6 (see FIG. 2) to the front-rear wheel driving force distribution device 20, and the ring gear 32 of the center differential 30 axially rotates, the carrier 34 may axially rotate. Thus, the rotation of the carrier 34 may be transmitted to the propeller shaft 8 on the front side via the first output shaft 35, the driven gear 36, and the drive gear 8A.

As described above, in the example embodiment, the gear ratio between the driven gear 36 and the drive gear 8A of the propeller shaft 8 may be 1:1, and accordingly the propeller shaft 8 on the front side may axially rotate at equal speed with the first output shaft 35, i.e., the carrier 34.

In addition, the rotation of the carrier 34 causes the second output shaft 37 to axially rotate.

Figure 5:
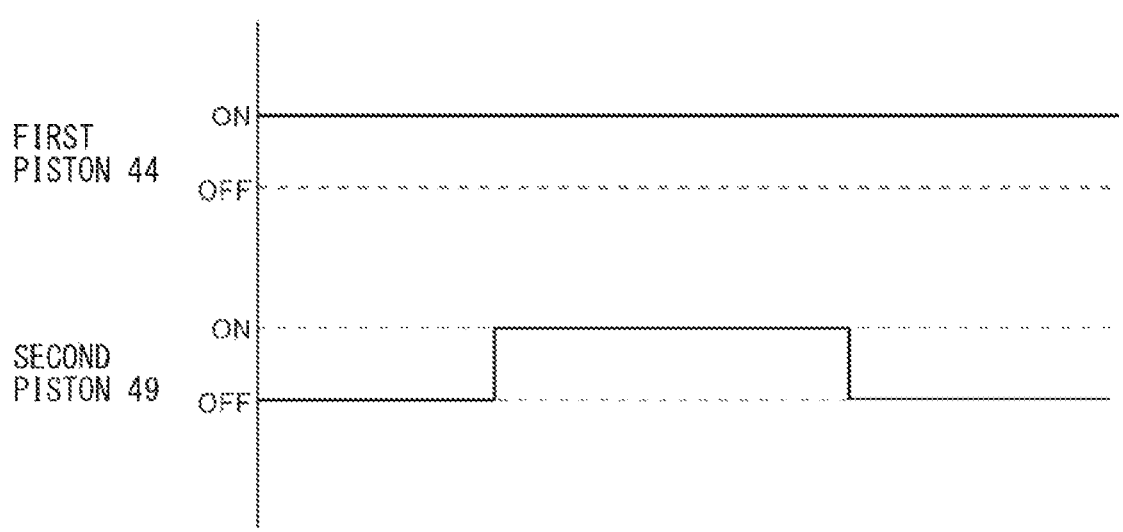
FIG. 5 is a timing chart illustrating an example of how a first piston and a second piston are controlled by the controller.

In this state, if the controller 21 operates the first piston 44 to engage the first clutch 41, for example, as illustrated in FIG. 5, the third drum 43 may rotate around the central axis at equal speed with the propeller shaft 8 on the front side.

Note that, in FIG. 5 and FIG. 7 to be described later, "ON" represents a state in which engagement is achieved by the first piston 44 or engagement is achieved by the second piston 49, and "OFF" represents a state in which disengagement is achieved by the first piston 44 or disengagement is achieved by the second piston 49.

In a case where the rotation of the rear wheels 3 and the propeller shaft 10 on the rear side is not particularly increased in speed, the number of rotations of the rear drum 12 may be the same as or lower than the number of rotations of the third drum 43. Therefore, in this case, the third drum 43 and the rear drum 12 may be coupled via the one-way clutch 50, and the rear drum 12 may axially rotate at equal speed with the propeller shaft 8 on the front side.

Consequently, in the example embodiment, operating the first piston 44 to engage the first clutch 41 results in a state in which the propeller shaft 8 on the front side and the propeller shaft 10 on the rear side rotate at equal speed.

Next, as illustrated in FIG. 5, the controller 21 may operate the second piston 49 to engage the second clutch 47, while keeping the state in which the first piston 44 is operated to engage the first clutch 41. In other words, the second piston 49 may be turned ON with the first piston 44 kept ON.

Thus, the second clutch 47 may be coupled to the propeller shaft 10 on the rear side via the rear drum 12.

By an action of the speed-increasing output shaft 46, the second clutch 47 may rotate at the number of rotations increased relative to the number of rotations of the second output shaft 37 of the carrier 34, thus rotating faster than the number of rotations of the third drum 43.

Therefore, the engagement by the second piston 49 results in a state in which the rear drum 12 rotates at increased speed, which results in a state in which the one-way clutch 50 idles. This blocks transmission of the rotating torque from the first clutch 41 to the rear drum 12.

However, this time, because the engagement of the second clutch 47 results in the state in which the rear drum 12 rotates at increased speed, the propeller shaft 10 on the rear side may rotate at increased speed.

Therefore, as a result of the engagement of the second clutch 47, the propeller shaft 10 on the rear side may eventually be switched to a state of axially rotating at increased speed relative to the propeller shaft 8 on the front side.

As described above, in the example embodiment, the second piston 49 may be operated to engage the second clutch 47, while keeping the state in which the first piston 44 is operated to engage the first clutch 41. In other words, the second piston 49 may be turned ON with the first piston 44 kept ON.

Thus operating the first piston 44 and the second piston 49 allows for a smooth increase in speed of the rotation of the rear drum 12. This allows the propeller shaft 10 on the rear side to naturally switch from a state of rotating at equal speed with the propeller shaft 8 on the front side to a state of rotating at increased speed.

Next, as illustrated in FIG. 5, the controller 21 may operate the second piston 49 to disengage the second clutch 47, while keeping the state in which the first piston 44 is operated to engage the first clutch 41. In other words, the second piston 49 may be switched from ON to OFF with the first piston 44 kept ON.

This results in disconnection between the second drum 48 and the rear drum 12. However, in this state, the rear drum 12 may still rotate faster than the third drum 43, which results in a state in which the one-way clutch 50 idles and the third drum 43 and the rear drum 12 are not coupled.

Therefore, the number of rotations of the rear wheels 3, i.e., the number of rotations of the propeller shaft 10 on the rear side and the rear drum 12 may smoothly decrease due to, for example, friction between the rear wheels 3 and the ground.

When the number of rotations of the rear drum 12 becomes the same as the number of rotations of the third drum 43, the third drum 43 and the rear drum 12 may be coupled via the one-way clutch 50.

Thus, the first drum 42 may be coupled to the rear drum 12 via the first clutch 41, the third drum 43, and the one-way clutch 50, resulting in a state in which the rotating torque of the first drum 42 is transmitted to the rear drum 12.

This allows the rear drum 12 to axially rotate at equal speed with the second output shaft 37 of the carrier 34, resulting in a return to the state in which the propeller shaft 10 on the rear side axially rotates at equal speed with the propeller shaft 8 on the front side.

As described above, in the example embodiment, the second piston 49 may be operated to disengage the second clutch 47, while keeping the state in which the first piston 44 is operated to engage the first clutch 41.

Thus operating the first piston 44 and the second piston 49 allows for smooth switching from a state in which the rotation of the propeller shaft 10 on the rear side is increased in speed relative to the rotation of the propeller shaft 8 on the front side to a state of rotating at equal speed.

Figure 6:
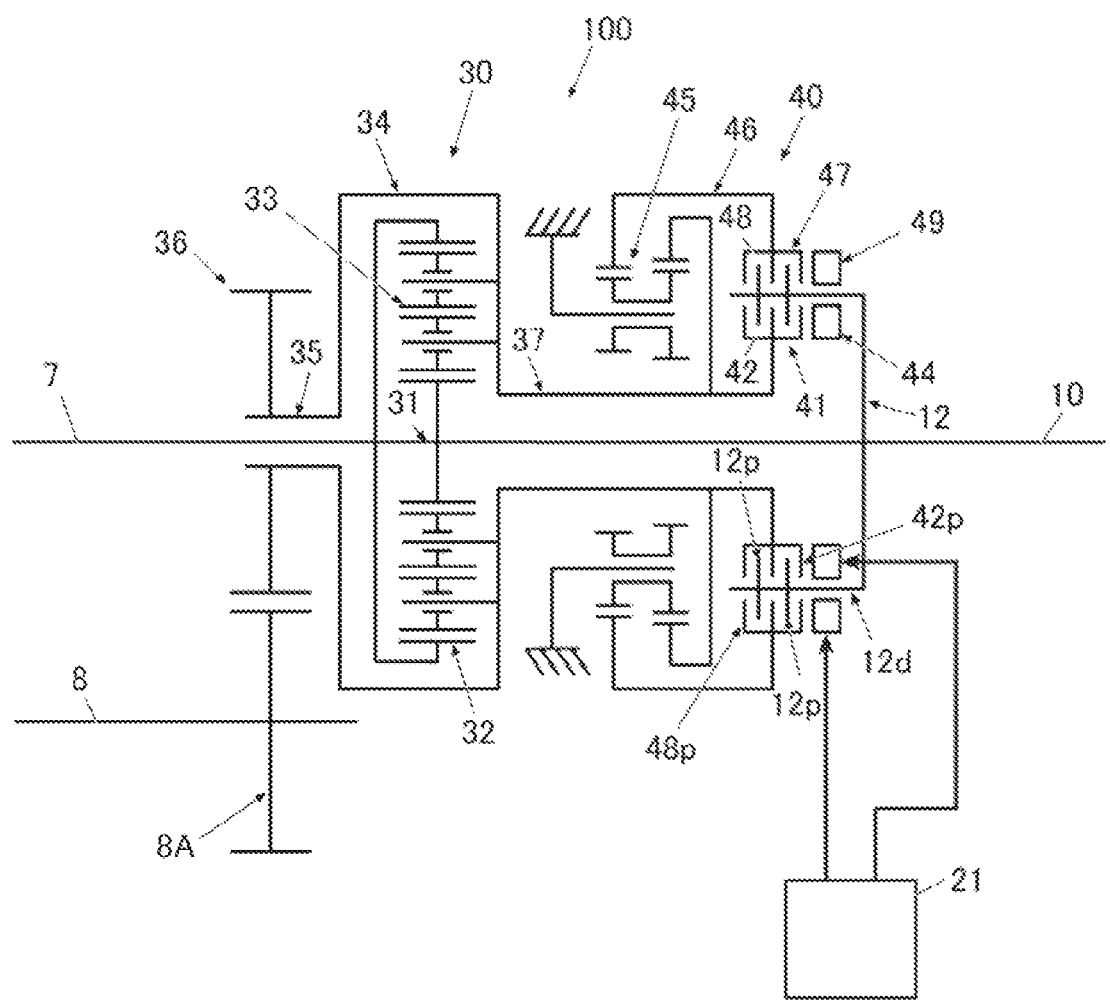
FIG. 6 is a skeleton diagram illustrating, as an example, a configuration of a front-rear wheel driving force distribution device including no one-way clutch.

Incidentally, increasing or reducing of the number of rotations of the propeller shaft 10 on the rear side and the rear wheels 3 described above may also be achieved by, for example, a front-rear wheel driving force distribution device 100 including no one-way clutch, illustrated as an example in FIG. 6.

In FIG. 6, members having the same functions as those in the front-rear wheel driving force distribution device 20 according to the example embodiment illustrated in FIG. 2 are denoted, for convenience, with the same reference numerals as those in FIG. 2. In addition, a description for such members is omitted.

The front-rear wheel driving force distribution device 100 illustrated as an example in FIG. 6 does not include the third drum 43 as well as the one-way clutch 50 included in the front-rear wheel driving force distribution device 20 illustrated in FIG. 2.

Multiple clutch plates 12*p* are provided to protrude from each of an inner circumferential surface and the outer circumferential surface of the cylindrical part 12*d* of the rear drum 12.

The first piston 44 is configured to engage the clutch plate 12*p* provided to protrude from the inner circumferential surface of the cylindrical part 12*d* of the rear drum 12, and the first clutch plate 42*p* provided to protrude from the outer circumferential surface of the first drum 42.

Thus, in the front-rear wheel driving force distribution device 100, it is possible to directly couple the first drum 42 and the rear drum 12 by engaging the first clutch 41 by the first piston 44.

Assumed here is a case of, in the front-rear wheel driving force distribution device 100 described above, switching the increasing or reducing of the number of rotations of the propeller shaft 10 on the rear side and the number of rotations of the rear wheels 3 as described above by operation of the first piston 44 and operation of the second piston 49.

In this case, the rotating torque of the output shaft 7 of the transmission 6 is transmitted to the propeller shaft 8 on the front side via the center differential 30, and the propeller shaft 8 on the front side axially rotates at equal speed with the first output shaft 35, i.e., the carrier 34. These points are similar to those described above.

Figure 7:
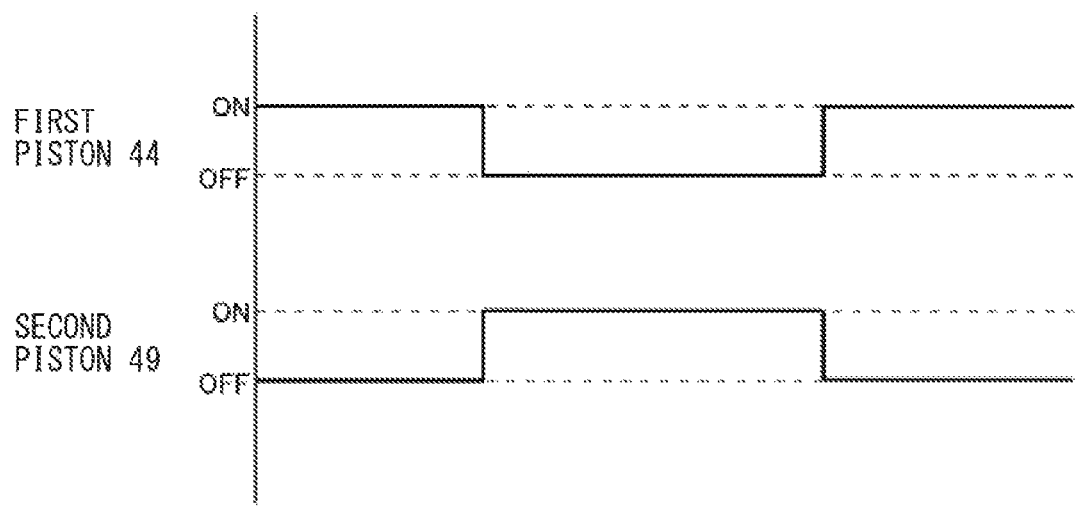
FIG. 7 is a timing chart illustrating an example of how the first piston and the second piston are controlled in the front-rear wheel driving force distribution device in FIG. 6.

In this state, if the first piston 44 is operated to engage the first clutch 41, for example, as illustrated in FIG. 7, the rear drum 12 axially rotates at equal speed with the propeller shaft 8 on the front side.

Therefore, also in this case, operating the first piston 44 to engage the first clutch 41 results in a state in which the propeller shaft 10 on the rear side rotates at equal speed with the propeller shaft 8 on the front side.

Next, in a case of switching the propeller shaft 10 on the rear side and the rear wheels 3 to a state of rotating at increased speed, it is necessary to operate the second piston 49 to engage the second clutch 47.

However, in this case, if the second clutch 47 is engaged by the second piston 49 with the first clutch 41 kept engaged by the first piston 44, an interlock phenomenon occurs unless clutch slipping occurs. This locks the rear wheels 3.

Therefore, in this case, it is necessary to precisely perform, at matched timing, disengagement of the first clutch 41 by the first piston 44 and engagement of the second clutch 47 by the second piston 49, as illustrated in FIG. 7.

This requests a high technical level.

In a case of switching the propeller shaft 10 on the rear side and the rear wheels 3 from a speed-increased state to a state of rotating at equal speed, this time, it is necessary to operate the first piston 44 to engage the first clutch 41.

However, in this case, if the first clutch 41 is engaged by the first piston 44 with the second clutch 47 kept engaged by the second piston 49, an interlock phenomenon similarly occurs unless clutch slipping occurs. This locks the rear wheels 3.

Therefore, also in this case, it is necessary to precisely perform, at matched timing, disengagement of the second clutch 47 by the second piston 49 and engagement of the first clutch 41 by the first piston 44, as illustrated in FIG. 7. This also requests a high technical level.

As described above, in the front-rear wheel driving force distribution device 100, it is desired to precisely perform switching between the operation of the first piston 44 and the operation of the second piston 49, i.e., clutch switching. However, this requests a high technical level due to, for example, variations in hydraulic pressure in the clutch.

In contrast, in the front-rear wheel driving force distribution device 20 and the controller 21 according to the example embodiment, the one-way clutch 50 is provided, which makes it possible to engage and disengage the second clutch 47 by the second piston 49, while keeping the first clutch 41 engaged by the first piston 44.

This makes it unnecessary to perform the precise clutch switching described above.

Therefore, it is possible to easily perform the increasing or reducing of the number of rotations of the propeller shaft 10 on the rear side and the increasing or reducing of the number of rotations of the rear wheels 3, which makes it possible to easily perform distribution of the driving force to the front wheels and the rear wheels, for example, distribution of the driving force to the rear wheels.

It is also possible to smoothly and appropriately perform the increasing or reducing of the number of rotations of the propeller shaft 10 on the rear side and the increasing or reducing of the number of rotations of the rear wheels 3, which makes it possible to smoothly and appropriately perform the distribution of the driving force to the front wheels and the rear wheels, for example, the distribution of the driving force to the rear wheels.

[Example Effects]

As described above, in the front-rear wheel driving force distribution device 20 and the controller 21 for the front-rear wheel driving force distribution device 20 according to the example embodiment, it is possible to easily and appropriately perform the distribution of the driving force to the front wheels and the rear wheels, for example, the distribution of the driving force to the rear wheels.

It is also possible to avoid occurrence of interlock in the front-rear wheel driving force distribution device 20 as described above, which makes it possible to improve vehicle safety and to improve clutch durability in the limited slip differential 40.

[Application Examples when Vehicle Travels Straight and when Vehicle Turns]

The control of the operation of the first piston 44 and the second piston 49 illustrated in FIG. 5 in the front-rear wheel driving force distribution device 20 and the controller 21 according to the example embodiment is applicable, for example, when the vehicle 1 travels straight and when the vehicle 1 turns.

The controller 21 may determine whether the vehicle 1 is traveling straight or turning on the basis of, for example, the steering angle of the steering wheel and the yaw rate of the vehicle 1 measured by the sensors 22 (e.g., a steering angle sensor and a yaw rate sensor).

Figure 8:
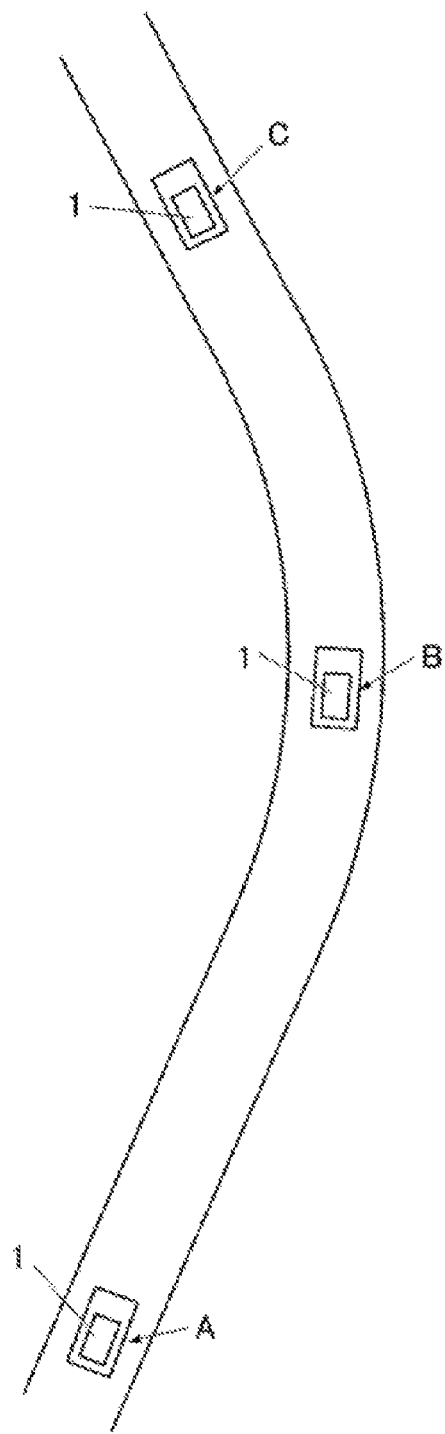
FIG. 8 is a diagram illustrating a state (A) in which the vehicle travels straight, a state (B) in which the vehicle turns, and a state (C) in which the vehicle starts to travel straight after turning.

For example, when the vehicle 1 travels straight as indicated by A in FIG. 8, the controller 21 may perform control to operate the first piston 44 to engage the first clutch 41. Thus, the propeller shaft 10 on the rear side and the propeller shaft 8 on the front side may rotate at equal speed with each other.

This results in a state in which the left and right front wheels 2 and the left and right rear wheels 3 rotate at the same number of rotations as each other, and causes an anti-yaw moment, resulting in favorable straight line stability of the vehicle 1.

When the vehicle 1 turns as indicated by B in FIG. 8, the controller 21 may perform control to operate the second piston 49 to engage the second clutch 47, while keeping the state in which the first piston 44 is operated to engage the first clutch 41. This allows for smooth switching to a state in which the propeller shaft 10 on the rear side is increased in speed relative to the propeller shaft 8 on the front side, as described above.

This makes the rotating torque on the rear wheels 3 side larger than on the front wheels 2 side, and makes the driving force on the rear wheels 3 side larger than on the front wheels 2 side. This increases an allowance for tire lateral force with respect to a limit of friction force, on the front wheels 2 side, which improves turnability of the vehicle 1.

In addition, in a case where the front-rear wheel driving force distribution device 20 includes a center differential, i.e., the center differential 30, as in the example embodiment, the rotating torque can move to the front wheels 2 side or move to the rear wheels 3 side when various events occur at the time of turning.

However, the control may be performed to make the rotating torque on the rear wheels 3 side larger than the rotating torque on the front wheels 2 side at the time of turning as described above. This prevents the rotating torque from easily moving to the front wheels 2 side even if various events occurs at the time of turning. This brings about an effect such as suppression of front-rear movement of the rotating torque at the time of turning.

Further, when the vehicle 1 turns, the rotation of the propeller shaft 10 on the rear side may be increased in speed relative to the rotation of the propeller shaft 8 on the front side as described above. This makes the number of rotations of the rear wheels 3 larger than the number of rotations of the front wheels 2 by the predetermined ratio (e.g., several percent).

This results in a larger slip angle of a body of the vehicle 1. Also in this respect, such control brings about an effect such as an improvement in the turnability of the vehicle 1.

In a case where the vehicle 1 leaves a corner and starts to travel straight after turning as indicated by C in FIG. 8, the controller 21 may operate the second piston 49 to disengage the second clutch 47, while keeping the first piston 44 in operation to engage the first clutch 41.

This allows for smooth switching from a state in which the rotation of the propeller shaft on the rear side is increased in speed relative to the rotation of the propeller shaft 8 on the front side to a state of rotating at equal speed, as described above.

This eliminates or reduces a difference between the number of rotations of the front wheels 2 and the number of rotations of the rear wheels 3, which makes it easier to suppress occurrence of a slip at the front wheels 2 and the rear wheels 3, for example, the rear wheels 3.

This also results in favorable straight line stability of the vehicle 1, as in the above case where the vehicle 1 travels straight.

[Regarding Case Where Rear Wheels Come Off or Slip]

In a case where the front-rear wheel driving force distribution device 20 includes a center differential, i.e., the center differential 30, as in the example embodiment, if the rear wheel 3 comes off or if the rear wheel 3 slips, for example, on ice, the rotation of the front wheels 2 stops, which makes the vehicle 1 unable to escape from such a state.

Note that, in the following, a state in which the rear wheel 3 comes off or the rear wheel 3 slips, for example, on ice may be simply referred to as a state in which "a rear wheel slip occurs".

In the front-rear wheel driving force distribution device 20 according to the example embodiment, in a case where a rear wheel slip occurs, the front wheels 2 may be stopped, and accordingly the rotation of the propeller shaft 8 on the front side may also be stopped.

Therefore, the axial rotation of the first clutch 41 may also be stopped.

In a case of such a state in which a rear wheel slip has occurred, the controller 21 may control the limited slip differential 40 of the front-rear wheel driving force distribution device to exert a front-rear limited slip differential function.

However, in the example embodiment, if the first piston 44 is operated to engage the first clutch 41 in the above state, the third drum 43 may not rotate because the first clutch 41 is not axially rotating.

On the other hand, the rear wheels 3 may be rotating, and accordingly the propeller shaft on the rear side and the rear drum 12 may be axially rotating.

This causes the one-way clutch 50 to idle, and the rotating torque is not sufficiently transmitted from the rear wheels 3 side to the front wheels 2 side, which can inhibit sufficient exertion of the front-rear limited slip differential function.

Therefore, in a case where a rear wheel slip thus occurs, for example, the controller 21 may be configured to operate the second piston 49 instead of the first piston 44, to engage the second clutch 47.

Such a configuration allows the propeller shaft 10 on the rear side and the propeller shaft 8 on the front side to be coupled not via the one-way clutch 50. This makes it possible to transmit the rotating torque from the rear wheels 3 side to the front wheels 2 side, and cause the front wheels 2 to rotate, making it possible to escape from a rear wheel slip state.

However, in the example embodiment, if the second clutch 47 is engaged, the rear wheels 3 side may be increased in speed than the front wheels 2, as described above. Conversely, the number of rotations of the front wheels 2 does not increase so much even if the control is performed as described above.

Therefore, large driving force is not caused for the front wheels 2, which can make it difficult to escape from the rear wheel slip state.

Hence, the limited slip differential 40 of the front-rear wheel driving force distribution device 20 may additionally include a new component, and may be configured to, when a rear wheel slip occurs, couple the first clutch 41 and the propeller shaft 10 on the rear side, not via the one-way clutch 50.

Figure 9:
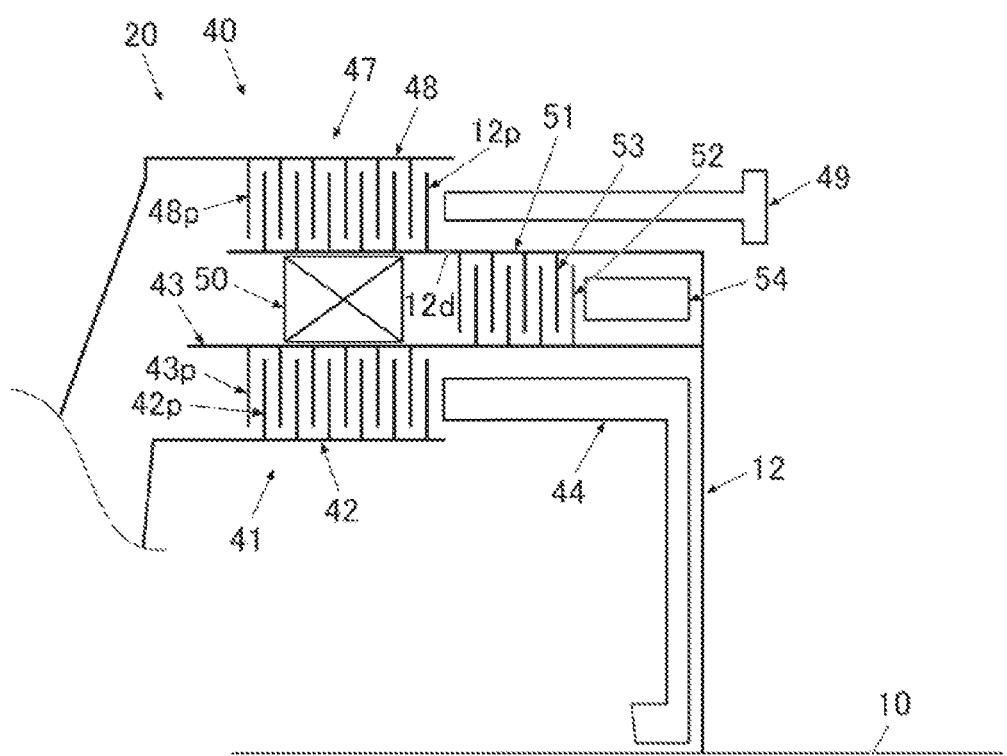
FIG. 9 is an enlarged diagram illustrating a part of a limited slip differential in a front-rear wheel driving force distribution device according to a modification example of one example embodiment.
Figure 10:
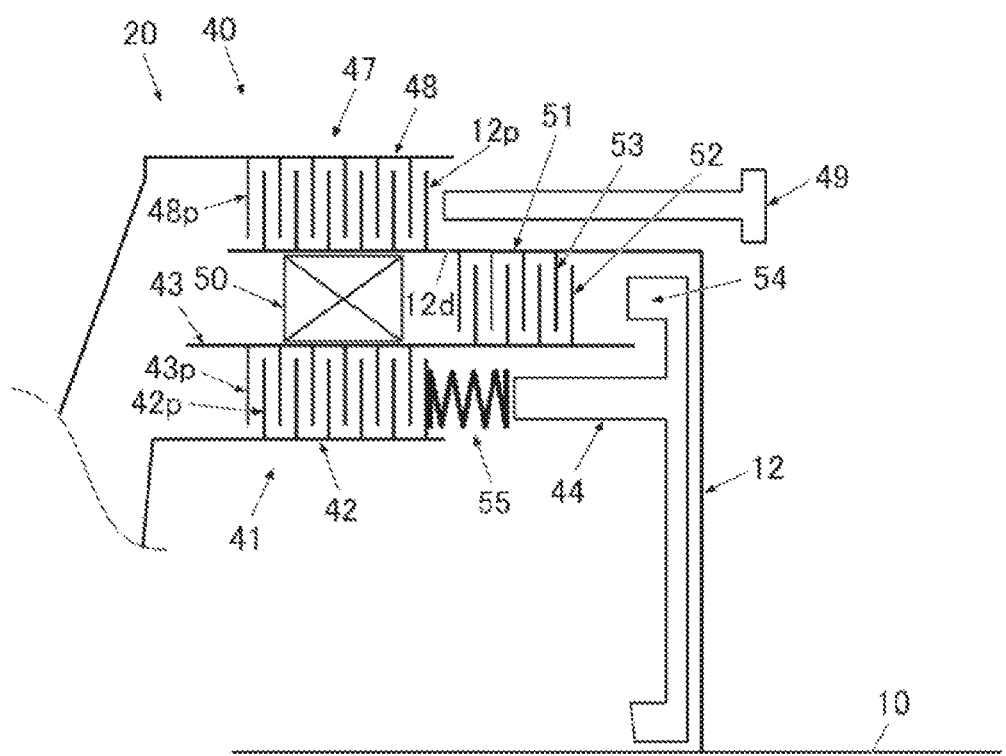
FIG. 10 is an enlarged diagram illustrating a part of the limited slip differential in a front-rear wheel driving force distribution device according to another modification example of one example embodiment.

FIG. 9 and FIG. 10 are enlarged diagrams each illustrating a part of the limited slip differential in a front-rear wheel driving force distribution device according to a modification example of the example embodiment. Note that the limited slip differential 40 may have up-down symmetry on the drawing, as illustrated in FIG. 2, for example. Therefore, in the modification examples illustrated in FIG. 9 and FIG. 10, a lower part on the drawing is omitted, and only an upper part on the drawing is illustrated.

In the above example embodiment, the one-way clutch 50 may be disposed between the third drum 43 and the rear drum 12. In this modification example, a third clutch 51 may be provided, in addition to the one-way clutch 50, between the third drum 43 and the rear drum 12.

For example, multiple fifth clutch plates 52 may be provided to protrude outward radially on an outer circumferential surface of the third drum 43. The multiple fifth clutch plates 52 may be arranged in parallel in the central axis direction of the third drum 43 (i.e., the front-rear direction).

In addition, multiple sixth clutch plates 53 may be provided to protrude inward radially on the inner circumferential surface of the cylindrical part 12*d* of the rear drum 12. The multiple sixth clutch plates 53 may be arranged in parallel in the central axis direction of the cylindrical part 12*d* (i.e., the front-rear direction).

The fifth clutch plates 52 may be disposed in a state of each being inserted between the sixth clutch plates 53. Thus, the fifth clutch plate 52 and the sixth clutch plate 53 may be disposed in a state of being alternately arranged in the front-rear direction.

As described above, in the modification example, the third clutch 51 engageable by a third piston 54 to couple the first clutch 41 and the propeller shaft 10 on the rear side not via the one-way clutch 50 may be provided between the first clutch 41 and the propeller shaft 10 on the rear side.

In the modification examples illustrated in FIG. 9 and FIG. 10, the controller 21 may perform control to operate the third piston 54 to engage the third clutch 51 to thereby couple the first clutch 41 and the propeller shaft 10 on the rear side.

Thus, the third clutch 51 may be engaged by the third piston 54, and the first clutch 41 may be engaged by the first piston 44.

By such control, the controller 21 may couple the propeller shaft 10 on the rear side and the propeller shaft 8 on the front side via the first clutch 41.

When a rear wheel slip occurs, the first clutch 41 and the third clutch 51 may thus each be engaged to couple the propeller shaft 10 on the rear side and the propeller shaft 8 on the front side, to thereby allow the propeller shaft 10 on the rear side and the propeller shaft 8 on the front side to rotate at equal speed.

As a result, the front wheels 2 and the rear wheels 3 may rotate at the same number of rotations, which allows the rotating torque to be sufficiently transmitted from the rear wheels 3 side to the front wheels 2 side, making it easier to escape from the rear wheel slip state.

In a case of the configuration in the above modification example, the third piston 54 may be separate from the first piston 44 and the second piston 49, for example, as illustrated in FIG. 9.

In this case, upon determining that a rear wheel slip has occurred on the basis of, for example, the number of rotations of the rear wheels 3, the controller 21 may operate the third piston 54 to engage the third clutch 51, and operate the first piston 44 to engage the first clutch 41. The controller 21 may be configured to couple the propeller shaft 10 on the rear side and the propeller shaft 8 on the front side by such control.

In another example, the third piston 54 may be one-piece with the first piston 44, as illustrated in FIG. 10. In such a configuration, the first piston 44 and the third piston 54 may operate integrally.

In that case, however, if the third clutch 51 is configured to be engaged at the same time as the first clutch 41 is engaged, providing the one-way clutch 50 becomes meaningless.

In other words, the third clutch 51 may also be engaged at the time when the first clutch 41 is engaged in such a configuration. Therefore, if the first piston 44 is operated to engage the first clutch 41, the first drum 42 and the rear drum 12 may eventually be coupled.

This is the same as in the front-rear wheel driving force distribution device 100 including no one-way clutch, illustrated as an example in FIG. 6. As a result, the advantageous workings and effects achieved by providing the one-way clutch 50, described in the above example embodiment, are no longer achieved.

Therefore, in the modification example illustrated in FIG. 10, even in a case of operating the first piston 44 and the third piston 54 integrally, the engagement of the third clutch 51 by the third piston 54 may be made to occur later than the engagement of the first clutch 41 by the first piston 44 by a time difference.

A detailed description is given below.

In the modification example illustrated in FIG. 10, a spring 55 may be disposed between one end of the first piston 44 and the first clutch plate 42p of the first clutch 41 (or the second clutch plate 43p of the third drum 43; the same holds true hereinafter). Note that, for example, rubber may be disposed in place of the spring 55.

The third piston 54 that is one-piece with the first piston 44 may be disposed to have one end positioned away from the fifth clutch plate 52 (or the sixth clutch plate 53; the same holds true hereinafter) of the third clutch 51 by some distance.

Figure 11:
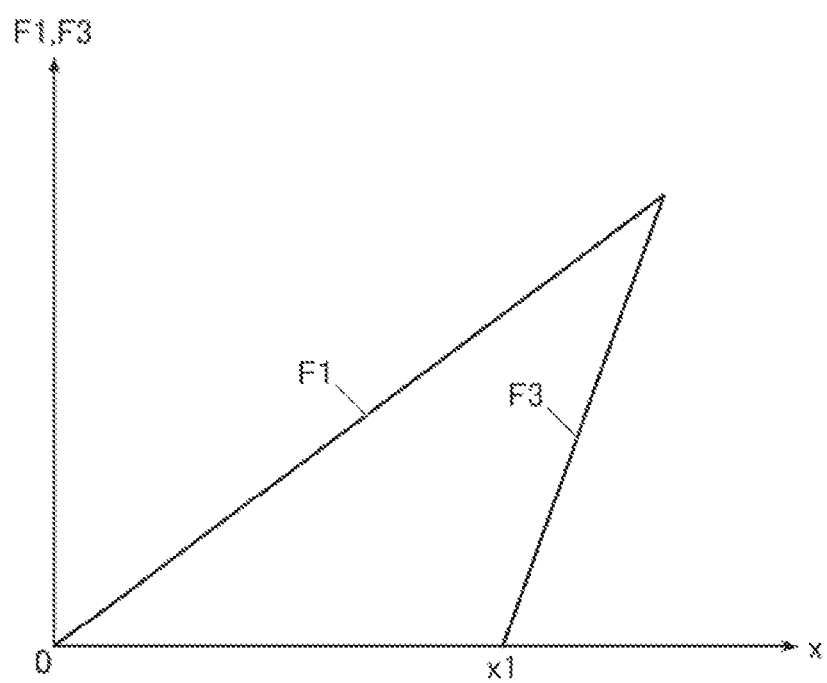
FIG. 11 is a graph illustrating a relationship between an amount of movement and a pressing force of the first piston and a relationship between an amount of movement and a pressing force of a third piston in the modification example illustrated in FIG. 10.

In a case of such a configuration, if the first piston 44 and the third piston 54 are operated to approach the first clutch 41 and the third clutch 51, a pressing force F1 applied by the first piston 44 and a pressing force F3 applied by the third piston 54 may each change, as illustrated in FIG. 11.

For example, as an amount of movement x of the first piston 44 to the first clutch plate 42p side increases, i.e., as the first piston 44 approaches the first clutch plate 42p, spring force of the spring 55 may become larger. This results in larger pressing force F1 applied to the first clutch plate 42p by the first piston 44.

However, the pressing force F3 applied to the fifth clutch plate 52 by the third piston 54 may be 0 until the third piston 54 comes into contact with the fifth clutch plate 52 (see a part from 0 to xl of F3 in a graph illustrated in FIG. 11).

Therefore, the first piston 44 may be configured to be moved to the first clutch plate 42p side, to engage the first clutch 41 by the pressing force F1 applied by the first piston 44 before the third piston 54 comes into contact with the fifth clutch plate 52.

Such a configuration makes it possible to achieve the advantageous workings and effects achieved by providing the one-way clutch 50, described in the above example embodiment.

In a case where a rear wheel slip occurs, the first piston 44 may be further moved to the first clutch plate 42p side, and the third piston 54 may be brought into contact with the fifth clutch plate 52, resulting in a state in which the fifth clutch plate 52 is pressed by the third piston 54.

Such control allows the first clutch 41 to be engaged by the first piston 44 and the third clutch 51 to be engaged by the third piston 54.

This couples the propeller shaft 10 on the rear side and the propeller shaft 8 on the front side, allowing the propeller shaft 10 on the rear side and the propeller shaft 8 on the front side to rotate at equal speed.

As a result, the front wheels 2 and the rear wheels 3 may rotate at the same number of rotations as each other, which allows the rotating torque to be sufficiently transmitted from the rear wheels 3 side to the front wheels 2 side, making it easier to escape from the rear wheel slip state.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The controller 21 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 21 illustrated in FIG. 1.

The invention claimed is:

1. A front-rear wheel driving force distribution device to be applied to a vehicle, the front-rear wheel driving force distribution device comprising:
    a center differential configured to distribute and output rotating torque inputted from a transmission of the vehicle to a propeller shaft on a front side and a propeller shaft on a rear side; and
    a limited slip differential comprising a first clutch, a second clutch, a first piston configured to engage the first clutch, a second piston configured to engage the second clutch, and a one-way clutch provided between the first clutch and the propeller shaft on the rear side, wherein
    the propeller shaft on the rear side is configured to, in a case where the second clutch is engaged by the second piston, rotate at increased speed as compared with a case where the first clutch is engaged by the first piston, and
    the one-way clutch is configured to
        couple the first clutch and the propeller shaft on the rear side in a case where a number of rotations of the first clutch is same as a number of rotations of the propeller shaft on the rear side or higher than the number of rotations of the propeller shaft on the rear side, and
        idle in a case where the number of rotations of the first clutch is lower than the number of rotations of the propeller shaft on the rear side.

2. The front-rear wheel driving force distribution device according to claim 1, wherein
    the center differential comprises a sun gear, a ring gear disposed outside the sun gear, multiple planetary gears disposed between the sun gear and the ring gear, and a carrier that supports the planetary gears to allow the planetary gears to revolve around a rotary shaft of the sun gear and supports each of the planetary gears to allow the planetary gear to rotate around a central axis of the planetary gear, and
    the center differential is configured to distribute and output the rotating torque inputted from the transmission to the ring gear, to the propeller shaft on the front side via the carrier, and to the propeller shaft on the rear side via the sun gear.

3. The front-rear wheel driving force distribution device according to claim 1,
wherein the limited slip differential further comprises, between the first clutch and the propeller shaft on the rear side, a third clutch configured to be engaged by a third piston to couple the first clutch and the propeller shaft on the rear side not via the one-way clutch.

4. The front-rear wheel driving force distribution device according to claim 2, wherein the limited slip differential further comprises, between the first clutch and the propeller shaft on the rear side, a third clutch configured to be engaged by a third piston to couple the first clutch and the propeller shaft on the rear side not via the one-way clutch.

5. The front-rear wheel driving force distribution device according to claim 3, wherein the third piston is one-piece with the first piston.

6. The front-rear wheel driving force distribution device according to claim 4, wherein the third piston is one-piece with the first piston.

7. A front-rear wheel driving force distribution device controller configured to control the front-rear wheel driving force distribution device according to claim 1, wherein the front-rear wheel driving force distribution device controller is configured to
operate the first piston to control engagement and disengagement of the first clutch, and
operate the second piston to control engagement and disengagement of the second clutch.

8. A front-rear wheel driving force distribution device controller configured to control the front-rear wheel driving force distribution device according to claim 2, wherein the front-rear wheel driving force distribution device controller is configured to
operate the first piston to control engagement and disengagement of the first clutch, and
operate the second piston to control engagement and disengagement of the second clutch.

9. The front-rear wheel driving force distribution device controller according to claim 7, wherein the front-rear wheel driving force distribution device controller is configured to operate the second piston to control the engagement and the disengagement of the second clutch, while keeping a state in which the first piston is operated to engage the first clutch.

10. The front-rear wheel driving force distribution device controller according to claim 8, wherein the front-rear wheel driving force distribution device controller is configured to operate the second piston to control the engagement and the disengagement of the second clutch, while keeping a state in which the first piston is operated to engage the first clutch.

11. The front-rear wheel driving force distribution device controller according to claim 7, wherein the front-rear wheel driving force distribution device controller is configured to perform control to
operate the first piston to engage the first clutch when the vehicle travels straight,
operate the second piston to engage the second clutch, while keeping a state in which the first piston is operated to engage the first clutch, when the vehicle turns, and
operate the second piston to disengage the second clutch, while keeping the state in which the first piston is operated to engage the first clutch, when the vehicle starts to travel straight after turning.

12. The front-rear wheel driving force distribution device controller according to claim 8, wherein the front-rear wheel driving force distribution device controller is configured to perform control to
operate the first piston to engage the first clutch when the vehicle travels straight,
operate the second piston to engage the second clutch, while keeping a state in which the first piston is operated to engage the first clutch, when the vehicle turns, and
operate the second piston to disengage the second clutch, while keeping the state in which the first piston is operated to engage the first clutch, when the vehicle starts to travel straight after turning.

13. The front-rear wheel driving force distribution device controller according to claim 9, wherein the front-rear wheel driving force distribution device controller is configured to perform control to
operate the first piston to engage the first clutch when the vehicle travels straight,
operate the second piston to engage the second clutch, while keeping the state in which the first piston is operated to engage the first clutch, when the vehicle turns, and
operate the second piston to disengage the second clutch, while keeping the state in which the first piston is operated to engage the first clutch, when the vehicle starts to travel straight after turning.

14. The front-rear wheel driving force distribution device controller according to claim 10, wherein the front-rear wheel driving force distribution device controller is configured to perform control to
operate the first piston to engage the first clutch when the vehicle travels straight,
operate the second piston to engage the second clutch, while keeping the state in which the first piston is operated to engage the first clutch, when the vehicle turns, and
operate the second piston to disengage the second clutch, while keeping the state in which the first piston is operated to engage the first clutch, when the vehicle starts to travel straight after turning.

15. The front-rear wheel driving force distribution device controller according to claim 7, wherein
the front-rear wheel driving force distribution device comprises, between the first clutch and the propeller shaft on the rear side, a third clutch engageable by a third piston to couple the first clutch and the propeller shaft on the rear side not via the one-way clutch, and
the front-rear wheel driving force distribution device controller is configured to, in a case where a rear wheel slip occurs, perform control to operate the third piston to engage the third clutch to thereby couple the first clutch and the propeller shaft on the rear side.

16. The front-rear wheel driving force distribution device controller according to claim 8, wherein
the front-rear wheel driving force distribution device comprises, between the first clutch and the propeller shaft on the rear side, a third clutch engageable by a third piston to couple the first clutch and the propeller shaft on the rear side not via the one-way clutch, and
the front-rear wheel driving force distribution device controller is configured to, in a case where a rear wheel slip occurs, perform control to operate the third piston to engage the third clutch to thereby couple the first clutch and the propeller shaft on the rear side.

17. The front-rear wheel driving force distribution device controller according to claim 9, wherein
the front-rear wheel driving force distribution device comprises, between the first clutch and the propeller shaft on the rear side, a third clutch engageable by a third piston to couple the first clutch and the propeller shaft on the rear side not via the one-way clutch, and the front-rear wheel driving force distribution device controller is configured to, in a case where a rear wheel slip occurs, perform control to operate the third piston to engage the third clutch to thereby couple the first clutch and the propeller shaft on the rear side.

18. The front-rear wheel driving force distribution device controller according to claim 10, wherein the front-rear wheel driving force distribution device comprises, between the first clutch and the propeller shaft on the rear side, a third clutch engageable by a third piston to couple the first clutch and the propeller shaft on the rear side not via the one-way clutch, and the front-rear wheel driving force distribution device controller is configured to, in a case where a rear wheel slip occurs, perform control to operate the third piston to engage the third clutch to thereby couple the first clutch and the propeller shaft on the rear side.

\* \* \* \* \*